2,719,089

STABILIZED PLASTIC COMPOSITION

James Sinnett Lovell, Charleston, W. Va., assignor to Union Carbide and Carbon Corporation, a corporation of New York No Drawing. Application January 11, 1950,
Serial No. 138,065

4 Claims. (Cl. 106—176)

The present invention relates to plastic compositions containing cellulose ethers and cellulose esters. More particularly, it is concerned with plasticized cellulose ethers and esters which combine in the same composition the properties of flexibility or toughness, flame-resistance, and heat-stability adequate to withstand injection molding operations.

As is well-known, unplasticized cellulose ethers and esters are too brittle to be useful in the form of film, and are not sufficiently thermoplastic to be formed or manipulated by other techniques. They do soften when heated, but they lack adequate flowability to permit of ready molding or other manipulation. In addition, the temperature at which discoloration or decomposition occurs lies so close to the softening temperature that considerable care and skill is required in the working of the unplasticized material.

One of the chief functions of plasticizers for cellulose ethers and esters, then, is to lower the softening point well below the temperature at which discoloration or other undesirable effects are liable to result, and also to lower the viscosity of the softened material. Another important function of the plasticizer is to give increased flexibility to the product, and also increased toughness or resistance to shock. Plasticizers also help in the manufacture of the plastic composition by causing the cellulose ether or ester to gel to a homogeneous mass, and thus they aid in the working up of the plastic mix, prior to formation into a sheet or a molding powder.

Certain specific plasticizers are also found to be valuable in imparting other properties to the finished plastic, for instance, flame-resistance. One of these, triphenyl phosphate, has long been used as a flame-retardant plasticizer in cellulose acetate and related cellulose derivatives, but its use also confers upon the plastic composition some undesirable characteristics such as excessive hardness and decreased light stability. As a plasticizer for cellulose ethers and esters, triphenyl phosphate suffers also from limited compatibility and requires the use of a co-plasticizer, such as diethyl phthalate, adequately to soften the plastic and to prevent crystallization and "blooming" of the triphenyl phosphate. This use of a second plasticizer which is flammable presents difficulties in the formulation and manufacture of the plastic composition, in order that the resulting product will have the requisite flexibility or softness while at the same time retaining the desired degree of flame resistance.

These difficulties would be largely minimized were it possible to employ a single plasticizer combining the flame-resistant qualities imparted by triphenyl phosphate and the qualities of softness and flexibility conferred by the dialkyl phthalates. Tri-(2-chloroethyl) phosphate, $(ClCH_2CH_2O)_3PO$ has been suggested for this purpose but its use has been limited to plastic compositions for the casting of films from solution and for other operations carried out at similar low processing temperatures, because cellulosic-resin compositions containing this plasticizer do not have adequate thermal stability to withstand the higher processing temperatures encountered in molding operations. This lack of adequate thermal stability is readily demonstrated upon heating a dilute solution of cellulose acetate in, for instance, tri - (2 - chloroethyl) phosphate. The solution darkens markedly and shows a pronounced drop in viscosity after heating at a temperature of 200° C. for thirty minutes, even in a glass test tube. In a steel container deterioration proceeds much more rapidly, and if an attempt is made to injection-mold a plastic composition which is, for instance, cellulose acetate plasticized with tri-(2-chloroethyl) phosphate, the material which issues from the heating chamber after thirty minutes' operation is a black syrupy liquid instead of the colorless plastic mass which is desired.

The present invention is based on my discovery that tri-(2-chloroethyl) phosphate-plasticized cellulose ethers can be effectively stabilized to withstand injection molding operations by the presence therein of an oxirane compound, as for instance the diglycidyl ether of ethylene glycol, of 2,4-pentanediol or of diphenylol propane, in an amount sufficient to provide at least 0.13 part by weight of the group

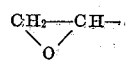

per 100 parts of the tri-(2-chloroethyl) phosphate plasticizer. Concentrations of less than 0.13 part do not appear to produce a measurable extent of stabilization. On the other hand, concentrations of the

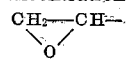

group, in excess of 3.8 parts per 100 parts of the phosphate ester do not provide a commensurate increase in stabilization, although the larger amounts can be used, if desired, without detrimental results. Injection-molded specimens of cellulose ethers or esters, plasticized with tri-(2-chloroethyl) phosphate and stabilized with an oxirane compound according to my invention show good color, flexibility and impact strength. The specimens are also rated as self-extinguishing under the flammability test conditions prescribed by A. S. T. M. test D-635-44.

The oxirane compounds which are preferred for making my improved plastic compositions and my improved stabilizing plasticizer blend are those which have a boiling point, at atmospheric pressure, of at least 150° C., which is about the temperature commonly employed in the fabrication of cellulose ethers and esters plasticized with tri-(2-chloroethyl) phosphate. These preferred oxirane compounds include, for instance, phenyl glycidyl ether, dibutyl phenyl glycidyl ether, diglycidyl ether of pyrocatechol, diglycidyl ether of 2,4,6-trichlororesorcinol, diglycidyl ether of 4,4'-dihydroxybenzophenone, diglycidyl ether of 4,4'-dihydroxydiphenyl, diglycidyl ether of 4,4'-dihydroxydiphenyl sulfone, diglycidyl ether of 2,4'-dihydroxydiphenyl sulfone, diglycidyl ether of 1,6-bis(4-hydroxyphenyl) n-hexane, diglycidyl ether of ethylene glycol, diglycidyl ether of diethylene glycol, diglycidyl ether of 2-methylol-4- tertiarybutylphenol, diglycidyl ether of 2,4-pentanediol, diglycidyl ether of 1,5-bis(4-hydroxyphenyl) n-pentane and the like.

The preferred oxirane compounds include also the diglycidyl ethers of diphenols as represented by the general formula

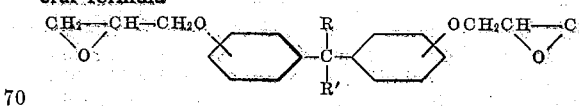

in which R and R', separately, can be hydrogen, methyl, ethyl, propyl, isopropyl, butyl, isobutyl, pentyl, isopentyl, hexyl, isohexyl, cyclohexyl, including the methyl, ethyl, propyl, butyl, pentyl and hexyl-substituted cyclohexyls, a phenyl, including the methyl, ethyl, propyl, butyl, pentyl, and hexyl-substituted phenyls; and in which R and R' taken together can be a cyclohexyl or a phenyl group, including the methyl, ethyl, propyl, butyl, pentyl, and hexyl-substituted cyclohexyls or phenyls such that the total number of carbon atoms in R and R' preferably does not exceed twelve. With R and R' having a total of twelve carbon atoms, the total number of carbon atoms to the molecule is thirty-one. These latter oxirane compounds as represented by the general formula include, for instance, diglycidyl ether of 1,1-bis(p-hydroxyphenyl) ethane, diglycidyl ether of 2,2'-dihydroxydiphenyl methane, diglycidyl ether of 2,4'-dihydroxydiphenyl methane, diglycidyl ether of 4,4-dihydroxydiphenyl cyclohexane, diglycidyl ether of 1-phenyl-1,1-bis(parahydroxyphenyl) ethane, diglycidyl ether of bis(2-hydroxy-3,5-ditertiarybutylphenyl) methane, diglycidyl ether of 2,2-bis(4-hydroxyphenyl) n-heptane, diglycidyl ether of 2,2-bis(4-hydroxyphenyl)-4-methyl pentane, diglycidyl ether of 2,2-bis(4-hydroxyphenyl) n-butane, diglycidyl ether of 4,4'-dihydroxydiphenyl methane, diglycidyl ether of 1,1-bis(4-hydroxyphenyl) n-butane, diglycidyl ether of 2,2-bis(3-methyl-4-hydroxyphenyl) propane, diglycidyl ether of 1,1-bis(4-hydroxyphenyl) n-heptane, diglycidyl ether of 1,1-bis(4-hydroxyphenyl)-2-ethylhexane diglycidyl ether of 4,4'-dihydroxydiphenyldimethyl methane, di(β-methyl glycidyl) ether of 4,4'-dihydroxydiphenyldimethyl methane and the like. The preferred oxirane compounds can also contain chlorine in the molecule of which diglycidyl ether of bis(2-hydroxy 3,5,6-trichlorophenyl) methane and diglycidyl ether of 2,2 - bis(3,5-dichloro-4-hydroxyphenyl) propane are representative, by way of further illustration.

If desired the lower oxirane compounds of which ethylene oxide and propylene oxide are illustrative can likewise be used as stabilizer. However, because of the relatively higher volatility of such lower oxirane compounds as compared with the preferred, it may be found desirable to employ them in a somewhat slightly higher concentration than the preferred compounds to compensate for possible losses during processing of the stabilized plastic composition.

In carrying out my invention an improved stabilizing-plasticizer blend can be made by adding to tri-(2-chloroethyl) phosphate an amount of oxirane compound which will provide a concentration of the

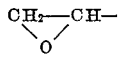

group therein of about 0.13 to 3.8 parts per 100 parts of the phosphate plasticizer. By way of illustration, such a concentration of the

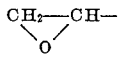

group would result from the addition to 100 parts of tri-(2-chloroethyl) phosphate of from 0.5 to 15 parts of the diglycidyl ether of diphenylol propane or from 0.3 to 10 parts of the diglycidyl ether of resorcinol, all by weight.

The stabilizer dissolves in the plasticizer, and the improved stabilizing plasticizer blend can be made simply by mixing the oxirane compound with the tri-(2-chloroethyl) phosphate. Solution of the oxirane compound in the phosphate is aided by agitation or by a combination of agitation with heating of the blend for approximately fifteen minutes. The blend can then be admixed with dry cellulose ether or cellulose ester and the material thoroughly colloided on a hot two-roll mill. The compounded resin can then be chipped or otherwise comminuted to a size suitable for molding extrusion operations.

The amount of tri-(2-chloroethyl) phosphate plasticizer that can be employed to advantage in my improved plastic composition is not critical. Desirable properties can be obtained with the phosphate ester present in amounts ranging from 10 to 50 parts per 100 parts of the cellulose ether or ester. An amount which is about 39 parts per 100 parts of the cellulose derivative is preferred. The presence of other plasticizers usually employed in cellulose ether and cellulose ester plastic compositions is not excluded since tri-(2-chloroethyl) phosphate is compatible with such plasticizers. However, to obtain a flame-resistant composition, where other plasticizers are present, it is essential for the purposes of the present invention that the tri-(2-chloroethyl) phosphate constitute from 40 to 100 per cent of the total plasticizer present in the composition.

The following examples are illustrative:

*Example 1*

A blend was made by dissolving 2.23 parts of the diglycidyl ether of 4,4'-dihydroxydiphenyldimethyl methane in 100 parts of tri-(2-chloroethyl) phosphate, to provide a concentration of 0.566 part of the group

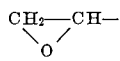

per 100 parts of the phosphate ester. To 70 parts of cellulose acetate was added 30 parts of the blend and this mixture was then thoroughly colloided on a hot two-roll mill, was chipped, dried at a temperature of 135° C. for a period of not less than 15 minutes, and immediately charged to an extrusion mold, with precautions being taken to minimize the absorption of atmospheric moisture by the compounded resin. The mold was then brought to a temperature of 180° C. in a steam-heated press and an initial specimen was extruded in the form of a rod one-sixteenth inch in diameter and ten inches long. Additional specimens were extruded at hourly intervals thereafter until the material degraded to a brown color. The extruded specimens were examined and compared for color, clarity, brittleness and character of the extruded surface. The time to slight discoloration was 210 minutes and the time to objectionable brittleness was 180 minutes. The final color was a light amber which required 450 minutes to attain.

These results are to be compared with those of a control test carried out in a similar manner wherein a plastic composition, which differed only in the absence of oxirane compound, required only 60 minutes to attain slight discoloration and only 45 minutes to attain objectionable brittleness. The final color was a dark brown which was attained in only 90 minutes.

*Example 2*

A blend was made by dissolving 0.3 part of the diglycidyl ether of 4,4'-dihydroxydiphenyldimethyl methane in 15 parts of tri-(2-chloroethyl) phosphate to provide a concentration of 0.506 part of the group

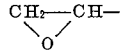

per 100 parts of the phosphate ester. Fifteen parts of this blend was added to 85 parts of cellulose acetate butyrate, and the mixture thoroughly colloided on a hot two-roll mill, was chipped, dried at a temperature of 135° C. for not less than 15 minutes and charged into an extrusion mold for testing according to the same procedure described in Example 1.

The time for slight discloroation was 120 minutes, and the time for objectionable brittleness to be attained was 480 minutes. The final color was a dark brown which was attained in 600 minutes.

A plastic composition which differed from the above compounded resin only by the absence of the oxirane compound was tested in the same maner as a control. The time required for the control to attain a slight discoloration was 90 minutes and for objectionable brittleness 60 minutes. The final color which was a dark brown was attained in 180 minutes.

Example 3

A test was carried out on a plastic composition compounded from cellulose acetate propionate using the same proportion of the same blend as was used in Example 2.

The time for slight discoloration was 120 minutes and the time for objectionable brittleness was 720 minutes. The final color was amber, which was attained in 720 minutes.

A control which differed from the above compounded resin only by the absence of the oxirane compound required 120 minutes to attain a slight discoloration and 240 minutes to attain objectionable brittleness. The final color was a dark amber which was attained in 360 minutes.

Example 4

A plastic composition was compounded from 85 parts of ethyl cellulose, type N, and 15 parts of the same blend employed in Example 1. The same procedure was used in colloiding and testing the composition as is described in Example 1. The time for slight discoloration was found to be 120 minutes and the time for objectionable brittleness to be attained was found to be 240 minutes. The final color was brown, which was attained in 240 minutes.

A control which differed from the above plastic composition only in the absence of the oxirane compound required only 15 minutes to attain slight discoloration, 120 minutes to attain objectionable brittleness. The final color was brown, attained in 120 minutes.

Example 5

Three plastic compositions were compounded from cellulose acetate using three different blends made by dissolving 2.22, 3.68 and 15 parts, respectively, of the diglycidyl ether of 4,4'-dihydroxydiphenyldimethyl methane in 100 parts of tri-(2-chloroethyl) phosphate, corresponding to concentrations of 0.562, 0.936 and 3.8 parts of the group $$CH_2\!-\!CH\!-$$
$$\diagdown\!O\diagup$$

per 100 parts of the phosphate ester. The resinous mixture was thoroughly colloided in a hot two-roll mill and the resultant compounded resin was then chipped, dried at a temperature of 135° C. for a period of not less than fifteen minutes and charged immediately into an extrusion mold. A number of cylindrical test specimens, ⅜ inch by ⅜ inch, were molded from each plastic composition and these specimens were then aged at a temperature of 205° C. for intervals of 30, 60 and 90 minutes, respectively. The flow temperature of these aged specimens were then determined according to the procedures specified in A. S. T. M. test D-569-44T. The results of the tests are given in the following table:

| 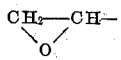 Content * | Flow Temperature (after aging at 205° C., for periods from 0 to 90 minutes.) | | | |
|---|---|---|---|---|
| | 0 | 30 | 60 | 90 |
| | °C. | °C. | °C. | °C. |
| 0.562 | 138.5 | 141.5 | 143.0 | 156.5 |
| 0.936 | 140.5 | 143.5 | 147.5 | 168.0 |
| 3.80 | 146.6 | | | 163.0 |

*Parts by weight, based on plasticizer.

These "flow temperature" values represent the temperatures required to effect a standard amount of flow in a specified period under a specified load (A. S. T. M., D-569-44T). Hence, the higher the flow temperature, the more viscous the material.

By way of comparison, similar tests were carried out on a plastic composition composed of 70 parts of cellulose acetate plasticized with 30 parts of tri-(2-chloroethyl phosphate) and differing in composition from those of the table only in the absence of the oxirane compound. This unstabilized plastic composition had flow temperatures of 133.0° C. and 123.5° C. after aging at 205° C. for 0 minutes and 30 minutes respectively. Aging periods above 30 minutes resulted in decomposition of the material.

By way of further comparison, a plastic composition composed of 70 parts of cellulose acetate plasticized with 30 parts of a 2:1 mixture of diethyl phthalate and dimethyl phthalate was observed to have flow temperatures of 159.5° C., 157.5° C., 149.5° C. and 148.5° C. after aging at a temperature of 205° C. for periods of 0, 30, 60 and 90 minutes respectively. However, this phthalic ester-plasticized material is not satisfactory for applications or uses requiring any appreciable degree of flame resistance, and although it shows a decline in viscosity after prolonged heating, that decline is negligible in comparison with that exhibited by the unstabilized composition plasticized with the phosphate ester. This viscosity-degradation of unstabilized tri-(2-chloroethyl) phosphate plasticized composition is accompanied by severe discoloration of the material. The presence of the oxirane compound according to my invention strongly inhibits development of color and arrests the tendency toward viscosity degradation.

Example 6

A number of plastic compositions were prepared containing 30 parts of plasticizer to 70 parts of cellulose acetate. As plasticizers, there were used (a) a 2:1 mixture of diethyl phthalate and dimethyl phthalate, which will be referred to for convenience here as phthalate ester, (b) tri-(2-chloroethyl) phosphate referred to here as phosphate ester, (c) a 1:1 mixture of phthalate ester and phosphate ester, (d) a 2:1 mixture of phthalate ester and phosphate ester and (e) a 9:1 mixture of phthalate ester and phosphate ester. Each of these plasticized compositions were tested for flammability under the test conditions prescribed in A. S. T. M. Flammability Test D-635-44.

The test results are set forth in the following table:

| Plastic Composition | No. of Pieces | No. of Ignitions Per Piece | Burning Rate, Inches/min., av. | Remarks |
|---|---|---|---|---|
| a | 1 | 1 | 1.77 | Completely consumed. |
| b | 3 | 3 | 0 | No free flame after ignition. |
| c | 3 | 3 | 0.50 | Self-extinguishing; 1.5 inches charred by ignition flame. |
| d | 3 | 2 | 0.75 | Self-extinguishing; after burning 2 and 4 inches respectively, two samples. |
| e | 2 | 1 | 1.18 | Completely consumed. |

From the foregoing data, plastic compositions wherein 40 to 100 per cent of the total plasticizer content is tri-(2-chloroethyl) phosphate are rated as non-flammable.

Example 7

A number of blends were made by dissolving 1.46 parts of the diglycidyl ether of resorcinol, 2.15 parts of the diglycidyl ether of normal butaldehyde and 2.88 parts of the diglycidyl ether of diphenylol sulfone, respectively, in separate portions of tri-(2-chloroethyl) orthophosphate, 100 parts, all by weight, each of these proportions corresponding to a concentration of 0.567 parts of the

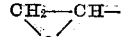

group per 100 parts of the phosphate plasticizer. Thirty parts of each of these blends were then admixed with separate portions, 70 parts, by weight, of cellulose acetate, and the mixtures thoroughly colloided on a hot two-roll mill. The compounded plastic compositions were chipped, dried at a temperature of 135° C. for not less than 15 minutes and immediately charged into an extrusion mold for testing as described in Example 1.

The results are set forth in the following table:

| Stabilizer | Time to slight discoloration, minutes | Time to final color, minutes | Final color |
|---|---|---|---|
| Diglycidyl ether of resorcinol | 300 | 450 | medium brown. |
| Diglycidyl ether of n-butaldehyde | 300 | 480 | Do. |
| Diglycidyl ether of diphenylol sulfone | 300 | 420 | light amber. |

In contrast to the above results, a test of plasticized cellulose acetate which differed from the above stabilized plastic compositions only in the absence of the oxirane compound required only 60 minutes to attain slight discoloration and only 120 minutes to attain its final brown coloration.

*Example 8*

A number of tests were run on cellulose acetate plasticized with tri-(2-chloroethyl) orthophosphate and stabilized with various oxirane compounds using the procedure described in Example 1. The oxirane compounds used as stabilizer were ethylene oxide, propylene oxide, epichlorhydrin, styrene oxide, 1,2-epoxybutene, glycidyl oleate and the glycidyl ether of crotyl phenol, respectively. An amount of stabilizer was used to give a concentration of 0.567 part of

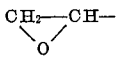

group per 100 parts of plasticizer except in the case of the styrene oxide where a concentration of 0.564 part of

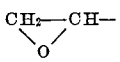

group was present. In each instance 30 parts of plasticizer-stabilizer blend were used per 70 parts of the cellulose acetate.

The test results were as follows:

| Stabilizer | Time to slight discoloration, minutes | Time to objectionable brittleness, minutes | Time to final color, minutes | Final color |
|---|---|---|---|---|
| Ethylene oxide | 120 | 90 | 180 | dark brown. |
| Propylene oxide | 150 | 150 | 210 | Do. |
| Epichlorhydrin | 180 | 180 | 300 | Do. |
| Styrene oxide | 120 | 180 | 300 | Do. |
| 1,2-Epoxybutene | 180 | 180 | 300 | Do. |
| Glycidyl oleate | 300 | 420 | 420 | light brown. |
| Glycidyl ether of crotyl-phenol | 300 | 300 | 390 | Do. |

In a control test carried out on a plastic composition which differed from the above orthophosphate plasticized cellulose acetate only in the absence of an oxirane compound as stabilizer, the time to slight discoloration was only 60 minutes and the time to objectionable brittleness only 45 minutes. The final color was a dark brown which was attained in only 90 minutes.

What is claimed is:

1. A stabilized flame-retardant plastic composition in which one of the group consisting of cellulose ethers and cellulose esters is plasticized with about one-ninth to one part of tri-(2-chloroethyl)orthophosphate per part of the cellulose compound and stabilized against discoloration and viscosity degradation for injection molding operations by the presence therein of an oxirane compound having the group

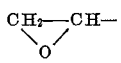

and which is a diglycidyl ether of a dihydroxy aromatic compound selected from the group consisting of resorcinol, 2,4,6-trichlororesorcinol, 4,4'-dihydroxydiphenyl, 1,6-bis(4-hydroxyphenyl)n-hexane, 1,5-bis(4-hydroxyphenyl)n-pentane, bis(2-hydroxy-3,5,6-trichlorophenyl) methane, 2,2-bis(3,5-dichloro-4-hydroxyphenyl) propane, bis(2-hydroxy-3,5-ditertiarybutylphenyl) methane, 2,2-bis(3-methyl-4-hydroxyphenyl) propane and a diglycidyl ether of a diphenol of the general formula:

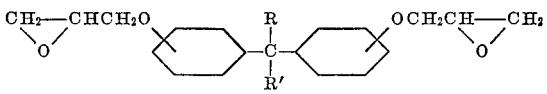

wherein R and R' are from the group consisting of hydrogen, alkyl, cyclohexyl, phenyl and alkyl-substituted cyclohexyl and phenyl with the number of carbon atoms in the alkyl group not exceeding six and the total number of carbon atoms in R and R' not exceeding twelve, said diglycidyl ether of said dihydroxy compound being present therein in an amount to provide from about 0.13 to 3.8 parts of the group

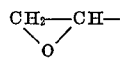

per part of tri-(2-chloroethyl)phosphate, all by weight.

2. A stabilizing-plasticizer blend comprising tri-(2-chloroethyl)orthophosphate and an oxirane compound having the group

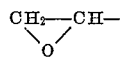

and which is a diglycidyl ether of a dihydroxy aromatic compound selected from the group consisting of resorcinol, 2,4,6-trichlororesorcinol, 4,4'-dihydroxydiphenyl, 1,6-bis(4-hydroxyphenyl)n-hexane, 1,5-bis(4-hydroxyphenyl)n-pentane, bis(2-hydroxy-3,5,6-trichlorophenyl) methane, 2,2-bis(3,5-dichloro-4-hydroxyphenyl)propane, bis(2 - hydroxy - 3,5 - ditertiarybutylphenyl) methane, 2,2 - bis(3 - methyl - 4 - hydroxyphenyl) propane and a diglycidyl ether of a diphenol of the general formula:

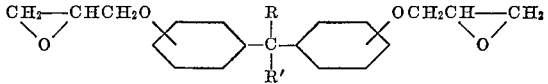

wherein R and R' are from the group consisting of hydrogen, alkyl, cyclohexyl, phenyl and alkyl-substituted cyclohexyl and phenyl with the number of carbon atoms in the alkyl group not exceeding six and the total number of carbon atoms in R and R' not exceeding twelve, said diglycidyl ether of said dihydroxy compound being present therein in an amount to provide from about 0.13 to 3.8 parts of the group

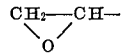

per part of tri-(2-chloroethyl)phosphate, all by weight.

3. A stabilized flame-retardant plastic composition in which one of the group consisting of cellulose ethers and cellulose esters is plasticized with about one-ninth to one part of tri-(2-chloroethyl)orthophosphate per part of the cellulose compound and stabilized against discoloration and viscosity degradation for injection molding operations by the presence therein of the diglycidyl ether of 4,4'-dihydroxydiphenyldimethyl methane, said diglycidyl ether of 4,4'-dihydroxydiphenyldimethyl methane being present therein in an amount to provide from about 0.13 to 3.8 parts of the group

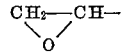

per part of tri-(2-chloroethyl)phosphate, all by weight.

4. A stabilized flame-retardant plastic composition in which one of the group consisting of cellulose ethers and cellulose esters is plasticized with about one-ninth to one part of tri-(2-chloroethyl)orthophosphate per part of the cellulose compound and stabilized against discoloration and viscosity degradation for injection molding operations by the presence therein of the diglycidyl ether of resorcinol, said diglycidyl ether of resorcinol being present therein in an amount to provide from about 0.13 to 3.8 parts of the group
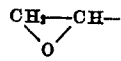
per part of tri-(2-chloroethyl)phosphate, all by weight.
References Cited in the file of this patent
UNITED STATES PATENTS
| | | |
|---|---|---|
| 2,181,085 | Alquist et al. | Nov. 21, 1939 |
| 2,181,100 | Slagh et al. | Nov. 21, 1939 |
| 2,330,251 | Taylor et al. | Sept. 28, 1943 |
| 2,371,500 | Britton et al. | Mar. 13, 1945 |
| 2,453,634 | Marple | Nov. 9, 1948 |